US006437975B1

(12) United States Patent
Huang

(10) Patent No.: US 6,437,975 B1
(45) Date of Patent: Aug. 20, 2002

(54) LCD SCREEN

(75) Inventor: Chen-Chi Huang, Taipei Hsien (TW)

(73) Assignee: Chuntex Electronic Co., Ltd., Taipei Hsien (TW)

( * ) Notice: Subject to any disclaimer, the term of this patent is extended or adjusted under 35 U.S.C. 154(b) by 11 days.

(21) Appl. No.: 09/667,432

(22) Filed: Sep. 22, 2000

(30) Foreign Application Priority Data

Aug. 7, 2000 (TW) .......................................... 89213677

(51) Int. Cl.[7] .................................................. G06F 1/16
(52) U.S. Cl. ....................... 361/681; 361/682; 361/727; 361/825; 248/223.4; 364/708.1
(58) Field of Search .................................... 361/681, 682, 361/727, 825; 248/223.4, 224.61, 284.1, 284, 917, 919–923; 364/708.1

(56) References Cited

U.S. PATENT DOCUMENTS

| 5,537,290 A | * | 7/1996 | Brown et al. ................ 361/681 |
| 5,854,735 A | * | 12/1998 | Cheng .......................... 361/681 |
| 6,081,420 A | * | 6/2000 | Kim et al. ................... 361/681 |
| 6,134,103 A | * | 10/2000 | Ghanma ..................... 361/681 |

* cited by examiner

Primary Examiner—Darren Schuberg
Assistant Examiner—Yean-Hsi Chang
(74) Attorney, Agent, or Firm—Staas & Halsey LLP

(57) ABSTRACT

An LCD screen consists of a screen body detachably attached on a holding plate, which is rotatably mounted around a base plate that is pivotally connected with a stand, whereby the screen is optional to be retained at or between a horizontal position or a vertical position; or is optionally secured with a fixed seat that is mounted on a wall, whereby the screen is detachably mounted on the wall.

12 Claims, 6 Drawing Sheets

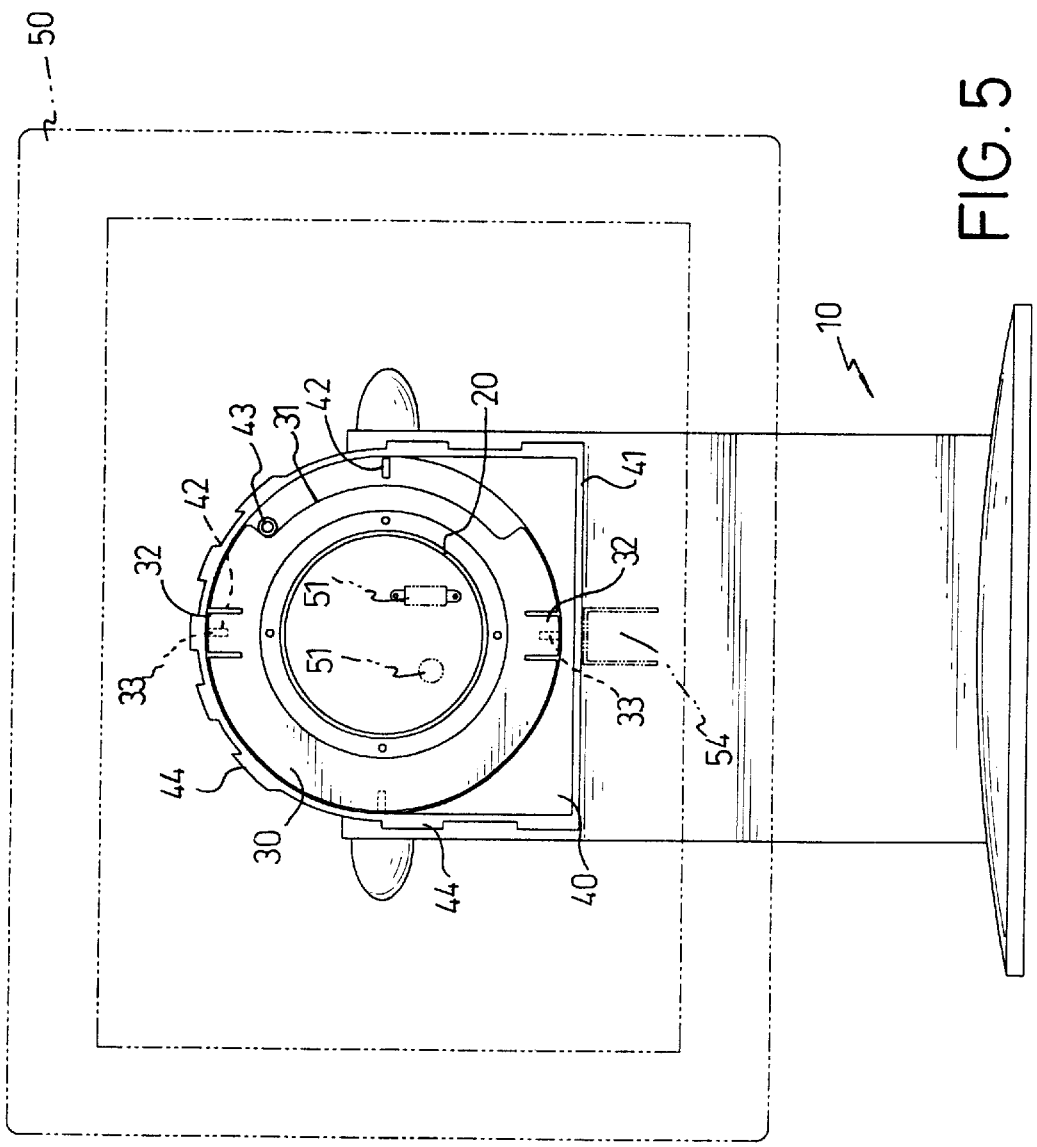

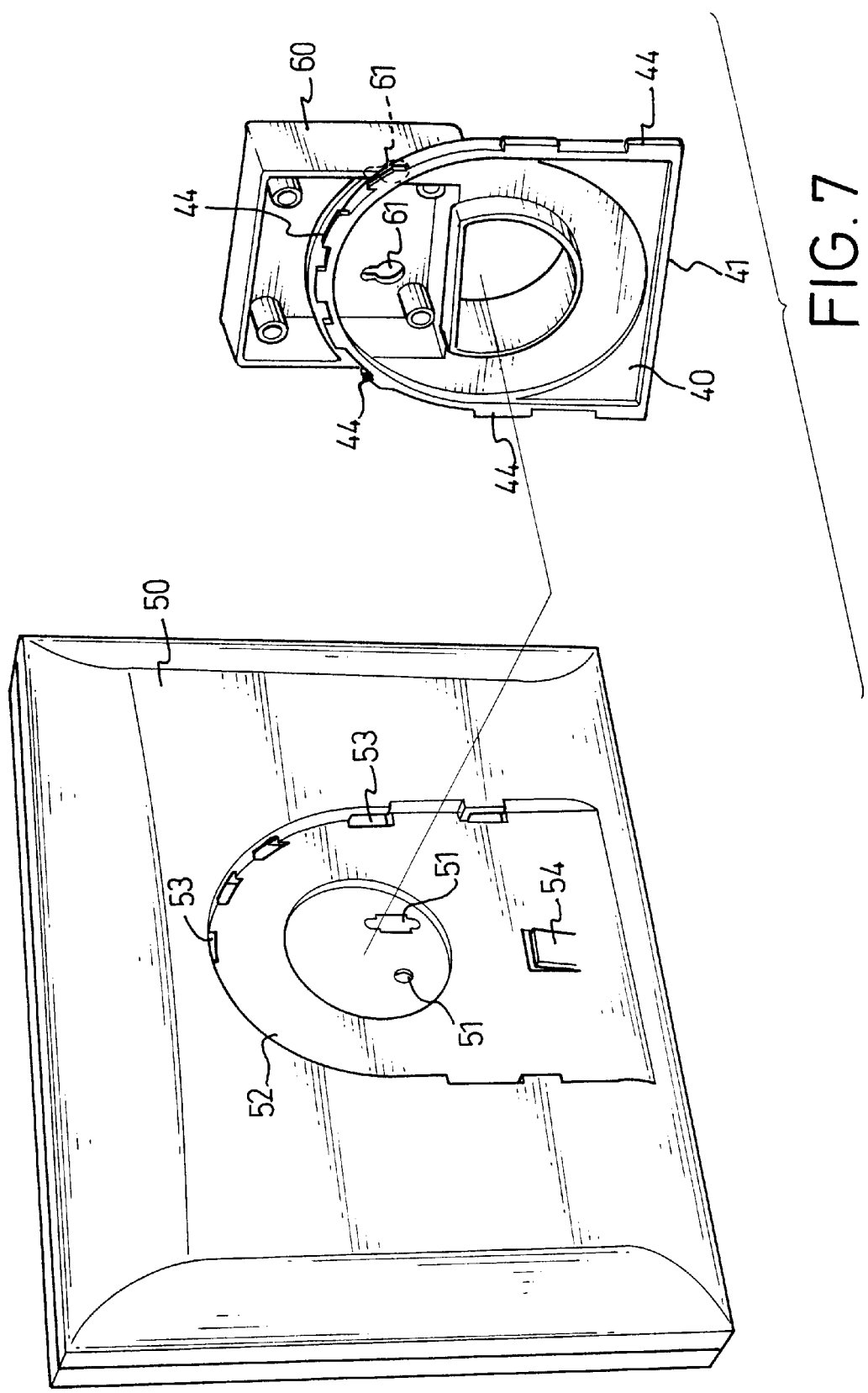

LCD SCREEN

BACKGROUND OF THE INVENTION

1. Field of the Invention

The present invention relates to an LCD screen having a screen body detachably attached on a holding plate, which is rotatably mounted on a stand, or optionally secured with a fixed seat that is mounted on a wall.

2. Description of Related Art

The LCD screen as one kind of input equipment of the computer is widely acceptable by various users for its lightness and convenience.

Conventional LCD screens normally consist of a stand and a screen body, which mar be integrally formed with the stand or be pivotally connected with the stand. The main defects of the conventional LCD screens are that the screen body with the stand occupies more space when in a package during transportation; and the screen body is retained in a fixed position only with its longest dimension horizontal.

Therefore, it is an objective of the invention to provide an improved LCD screen to mitigate and/or obviate the aforementioned problems.

SUMMARY OF THE INVENTION

The object of the present invention is to provide an LCD screen comprising a screen body detachably attached on a holding plate, which is rotatably mounted around a base plate that is pivotally connected with a stand, whereby the screen body attached on the holding plate is able to be retained with the longest dimension from horizontal to vertical positions; or is optionally secured with a fixed seat that is mounted on a wall, whereby the screen body is detachably mounted on the wall.

The detailed features of the present invention will be apparent in the detailed description with appropriate reference to the accompanying drawings.

BRIEF DESCRIPTION OF THE DRAWINGS

FIG. 5 is a schematic view of the LCD screen with the screen retained at a horizontal position;

FIG. 7 is an exploded perspective view of the LCD screen mounted on the wall.

DETAILED DESCRIPTION OF THE PREFERRED EMBODIMENT

Figure 1:
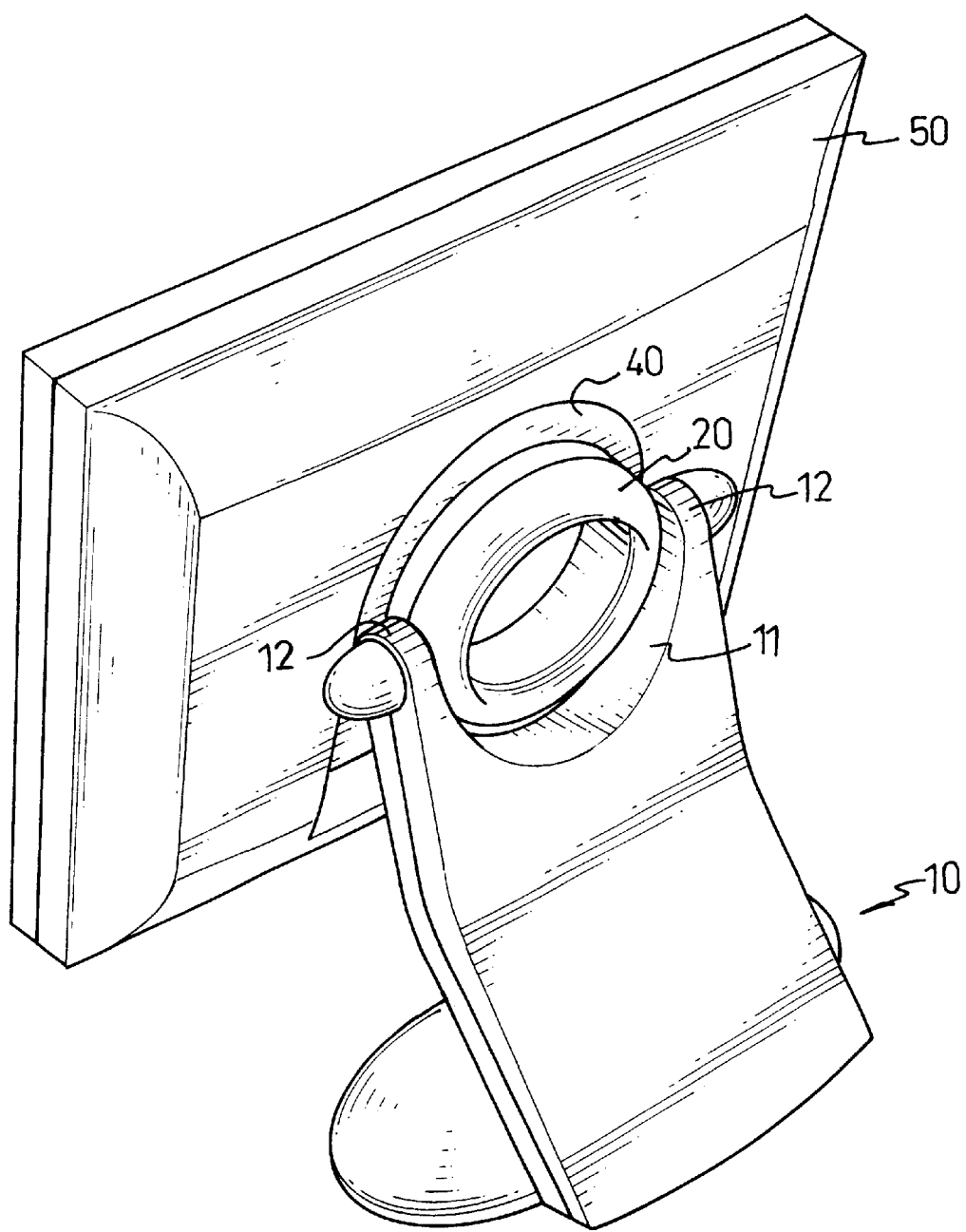
FIG. 1 is a perspective rear view of an LCD screen in accordance with the present invention.
Figure 2:
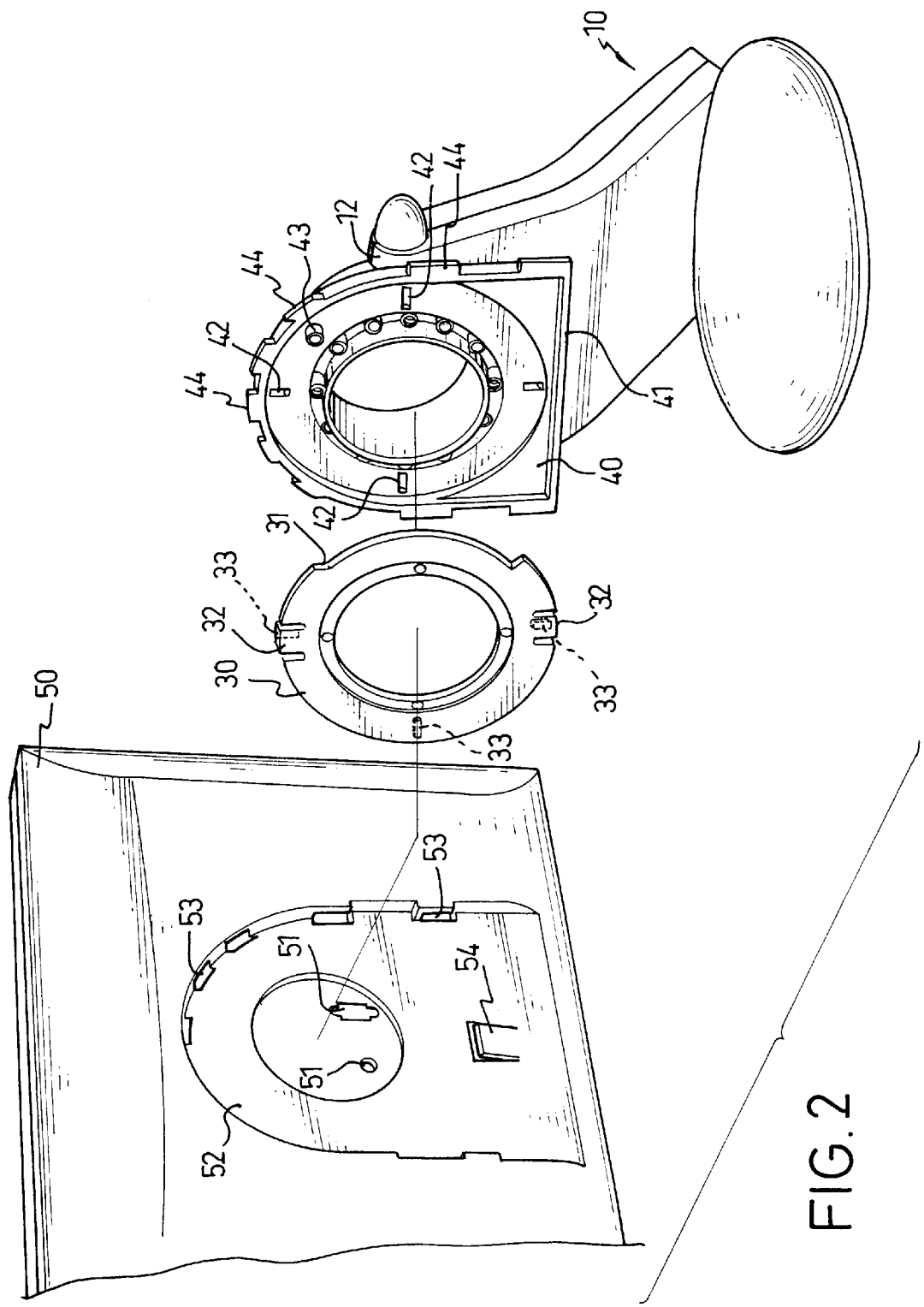
FIG. 2 is an exploded perspective view of the LCD screen in accordance with the present invention.

With reference to FIGS. 1 and 2, an LCD screen in accordance with the present invention comprises a substantially L-shaped stand (10), a base plate (20) pivotally connected to the stand (10), a fixing plate (30) fixed with the base plate (20), a holding plate (40) sandwiched between the base plate (20) and the fixing plate (30), and a screen body (50) detachably attached on the holding plate (40).

The stand (10) has a counter balance weight to balance the LCD screen. An upper end of the stand (10) is defined with a U-shaped recess (11), which is formed with two pivot lugs (12) at opposite inner sides thereof.

The base plate (20) is an annular shaped plate having two pivot holes defined in opposite outer sides thereof corresponding to the two lugs (12) of the stand (10), whereby the base plate (20) is pivotally connected with the stand (10).

Figure 3:
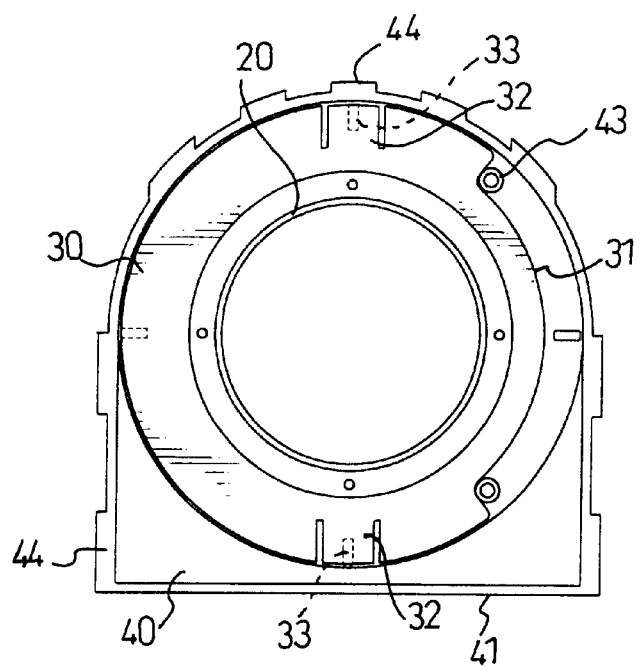
FIG. 3 is a front side view of a fixing plate and a holding plate of the LCD screen in accordance with the present invention.
Figure 6:
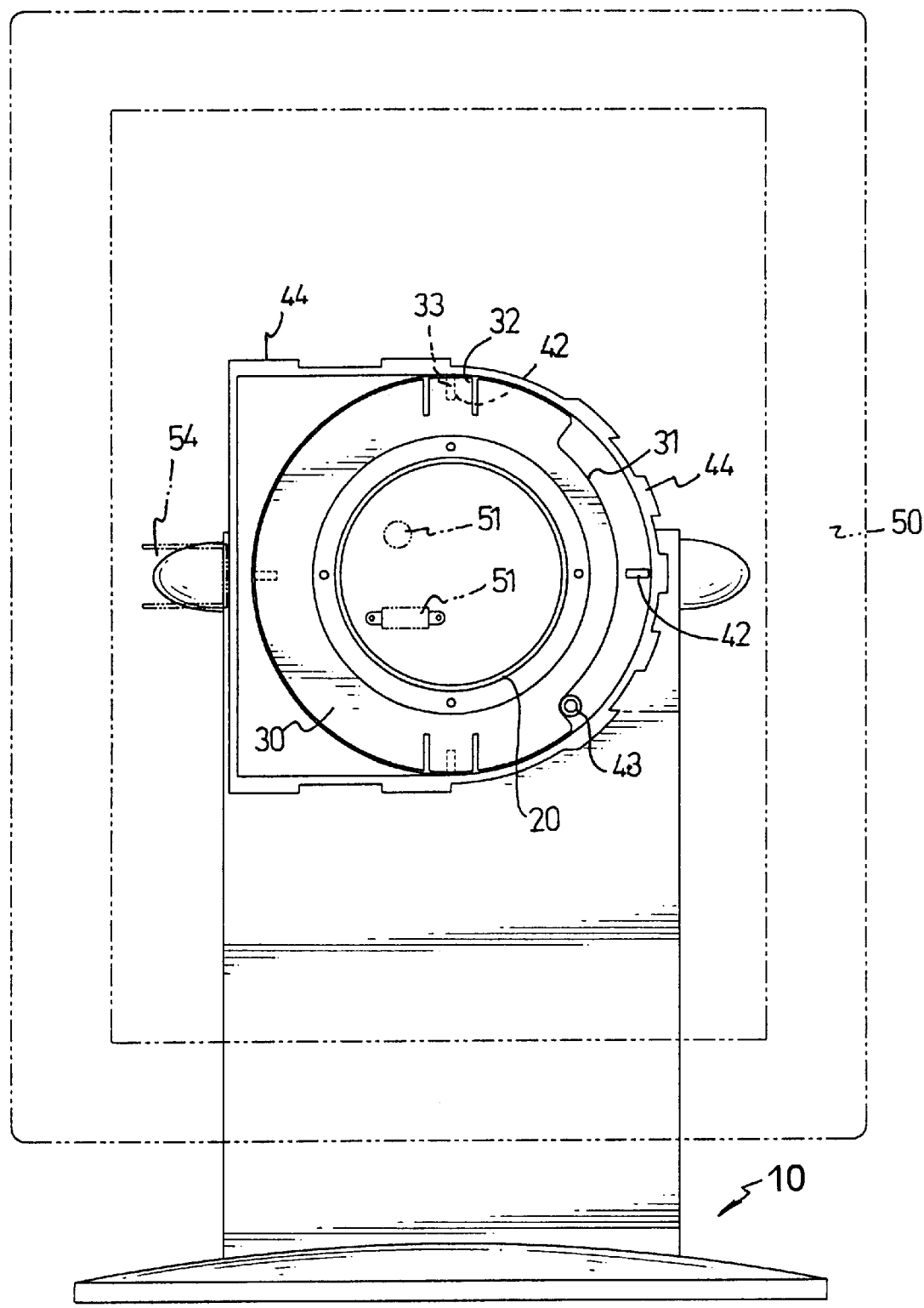
FIG. 6 is a schematic view of the LCD screen with the screen retained at a vertical position.

As best seen in FIGS. 2 and 3, the fixing plate (30) is a substantially annular shaped plate. An inner periphery of the fixing plate (30) is securely connected with a corresponding inner periphery of the base plate (20) by multiple bolts (not numbered). An arcuate cutout (31) of approximately 90° about the center of the fixing plate (30) is defined at a right side of the fixing plate (30). Upper and lower sides of the fixing plate (30) are respectively formed with two elastic strips (32), each of which is formed with a dome (33) on one face thereof facing the holding plate (40). A left side of the fixing plate (30) is also formed with a dome (33) on one face thereof facing the holding plate (40).

The holding plate (40) is a substantially annular shaped plate with a flat (41) formed along a bottom end thereof. The holding plate (40) is rotatably mounted around the base plate (20). Four equal-spaced positioning recesses (42) are respectively defined in one face at upper, lower, left and right sides thereof corresponding to the domes (33) and the arcuate cutout (31). A stop pin (43) formed on the holding plate (40) is slidable along the arcuate cutout (31) from an upper end to a lower end thereof. The upper, left and right ends of the holding plate (40) are formed with a plurality of spaced-apart tenons (44).

Figure 4:
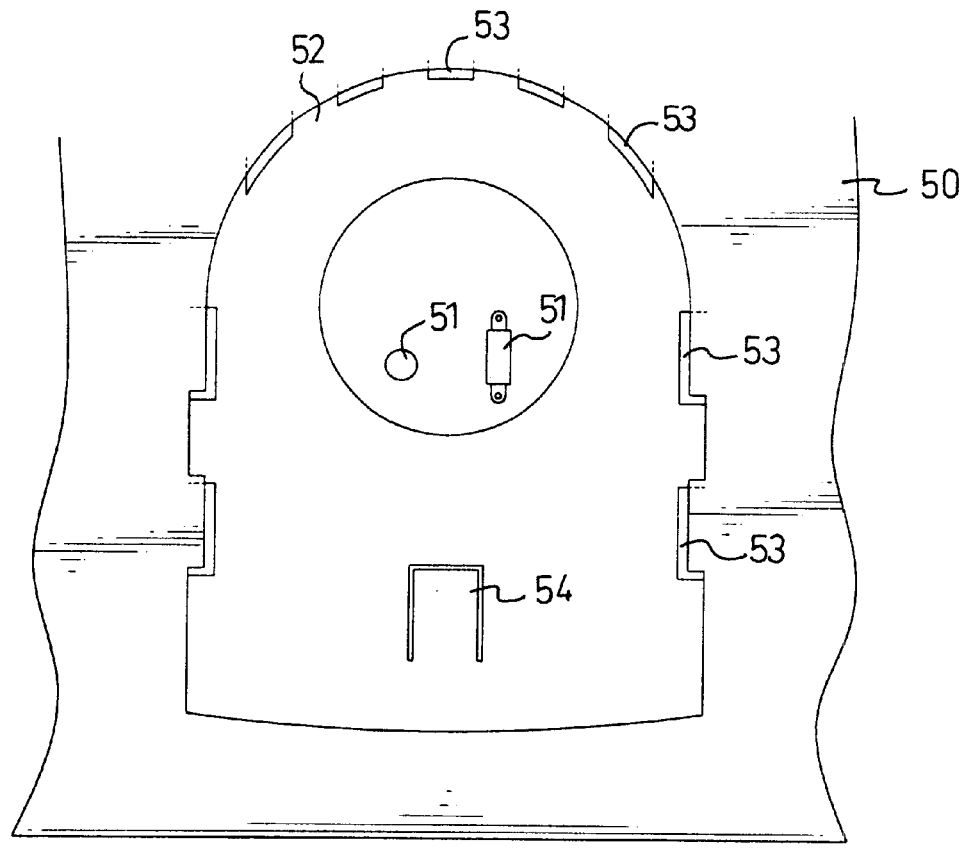
FIG. 4 is a rear side view of a screen body of the LCD screen in accordance with the present invention.

Now, with reference to FIG. 4, sockets (51) are defined in a bottom of a slideway (52), which is defined in a backside of the screen body (50) corresponding to the holding plate (40). Upper, left and right ends of the slideway (52) are defined with a plurality of mortises (53) corresponding to the plurality of tenons (44) of the holding plate (40). An elastic retainer (54) is integrally formed near an opening at a lower end of the slideway (52). A lower end of the elastic retainer (54) is integrally formed with the bottom of the slideway (52). An upper end of the elastic retainer (54) is resilient. When the holding plate (40) is inserted into the slideway (52) from the opening at the lower end of the slideway (52), the plurality of tenons (44) are respectively engaged into the corresponding mortises (53). The elastic retainer (54) is depressed as the holding plate (40) passes thereover, then the upper end of the elastic retainer (54) presses against the flat (41) of the lower end of the holding plate (40). Therefore the holding plate (40) is retained in the slideway (52) and the screen body (50) is securely attached on the holding plate (40), which is rotatably mounted around the base plate (20) of the stand (10).

The screen body (50) is also very easily detached from the holding plate (40) by a user. First the upper end of the elastic retainer (54) is pressed down to free the holding plate (40) from the slideway (52) of the screen body (50), and then the screen body (50) is pulled out of the slideway (52) by the user.

With reference to FIG. 5, the screen body (50) attached on the holding plate (40) is retained at a horizontal position. The stop pin (43) is retained by the upper end of the arcuate cutout (31), and the domes (33) are respectively fitted in the corresponding positioning recesses (42).

As the holding plate (40) is rotatably sandwiched between the fixing plate (30) and the base plate (20), the screen (50) can also be turned into a vertical position as shown in FIG.

6. The stop pin (43) slides from the upper end of the arcuate cutout (31) to the louver end thereof and is retained by the lower end thereof. The domes (33) are respectively retained in the next corresponding positioning recesses (42), therefore the screen (50) is retained at the vertical position.

In FIG. 7 which shows a second embodiment, a backside of a holding plate (40a) is secured with a fixed seat (60), which has multiple holes (61) defined in a backside thereof so that the fixed seat (60) can be mounted on an upright surface such as a wall fitted with multiple hanger pins corresponding to the multiple holes (61). The holding plate (40a) has a flat (41a) formed at a lower end thereof, and a plurality of tenons (44a) formed along upper, left and right ends thereof corresponding to the plurality of mortises (53) of the screen body (50). In this way the screen body (50) is detachably attached on the holding plate (40a), which is mounted on the wall via the fixed seat (60).

The present invention has following advantages:
1. As the screen body (50) is detachable from the holding plate (40, 40a), the screen body (50), the holding plate (40, 40a) and the stand (10) can be packed separately during transportation to save space, and the efficiency of the packaging of the LCD screen is improved;
2. As the holding plate (40) is rotatably sandwiched between the base plate (20) and the fixing plate (30), the position of the screen (50) is optional between a vertical position and a horizontal position; and as the base plate (20) is pivotally connected With the stand (10), the angle of the screen (50) can be pivotally adjusted back and forth; and
3. As the screen (50) has sockets (51) defined in the bottom of the slideway (52), wires connected to the sockets (51) are respectively extended through central openings of the holding plate (40), the fixing plate (30) and the base plate (20), therefore the rotation of the screen (50) has no obstacle from the wires.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. An LCD screen comprises:
a substantially L-shaped stand (10);
an annular base plate (20) pivotally connected with the stand (10) and having opposite sides thereof;
a substantially annular fixing plate (30) fixed with a corresponding inner periphery of the base plate (20) and having an inner periphery thereof;
a holding plate (40), which is sandwiched between the base plate (20) and the fixing plate (30) and rotatably mounted around the base plate (20); and
a screen body (50) having a slideway (52) defined in a backside thereof to fixedly receive the holding plate (40) therein, and an elastic retainer (54) formed at an opening at a lower end of the slideway (52), whereby the holding plate (40) is inserted into the slideway (52) and securely retained in the slideway (52) by the elastic retainer (54), therefore the screen body (50) is detachably attached on the holding plate (40), and the position of the screen body (50) is optional between a vertical position and a horizontal position.

2. The LCD screen as claimed in claim 1, wherein the stand (10) is defined with a U-shaped recess (11) having two pivot lugs (12) formed at opposite two inner sides of the recess (11), and the base plate (20) has two pivot holes defined in opposite outer sides thereof corresponding to the pivot lugs (12).

3. The LCD screen as claimed in claim 1, wherein the fixing plate (30) is provided with an arcuate cutout (31) formed as 90° about the center thereof, and a stop pin (43) is formed on an end face of the holding plate (40) corresponding to the arcuate cutout (31).

4. The LCD screen as claimed in claim 1, wherein upper and lower ends of the fixing plate (30) are respectively formed with two elastic strips (32), each elastic strip (32) is formed with a dome (33) on one face thereof facing the holding plate (40), a side of the fixing plate (30) is also formed with a dome (33) on one face thereof facing the holding plate (40), and the holding plate (40) is defined with four equal-spaced positioning recesses (42) corresponding to the domes (33) and the arcuate cutout (31).

5. The LCD screen as claimed in claim 1, wherein the holding plate (40) has a flat (41) formed at a lower end thereof.

6. The LCD screen as claimed in claim 5, wherein a lower end of the elastic retainer (54) is integrally formed with the bottom of the slideway (52), an upper end of the elastic retainer (54) is resilient, whereby when the holding plate (40) is inserted into the slideway (52), the upper end of the elastic retainer (54) is pressed against the flat (41) of the holding plate (40).

7. The LCD screen as claimed in claim 1, wherein upper, left and right ends of the holding plate (40) are formed with multiple tenons (44) therearound, and upper, left and right ends of the slideway (52) are defined with multiple mortises (53) corresponding to the tenons (44).

8. The LCD screen as claimed in claim 1, wherein sockets (51) are defined around the center of the bottom of the slideway (52).

9. An LCD screen comprises:
a holding plate (40a), which is substantially annular with a flat (41a) formed at a lower end thereof;
a fixed seat (60), which is secured at a backside of the holding plate (40a), and defined with multiple holes in a backside thereof;
a screen body (50) having a slideway (52) defined in a backside thereof to receive the holding plate (40a) fixed therein, and an elastic retainer (54) formed at an opening at a lower end of the slideway (52), whereby the screen body (50) is detachably attached on the holding plate (40a), which is mountable on an upright surface via the fixed seat (60).

10. The LCD screen as claimed in claim 9, wherein a lower end of the elastic retainer (54) is integrally formed with the bottom of the slideway (52), and an upper end of the elastic retainer (54) is resilient, whereby when the holding plate (40a) is inserted into the slideway (52), the upper end of the elastic retainer (54) is pressed against the flat (41a) of the holding a plate (40a).

11. The LCD screen as claimed in claim 9, wherein upper, left and right ends of the holding plate (40a) are formed with multiple tenons (44a) therearound, and upper, left and right ends of the slideway (52) are defined with multiple mortises (53) corresponding to the tenons (44).

12. The LCD screen as claimed in claim 9, wherein sockets (51) are defined around the center of the bottom of the slideway (52).

* * * * *